Dec. 12, 1933.      A. O. ABBOTT, JR      1,938,787
PROCESS AND APPARATUS FOR MANUFACTURING TIRES
Filed March 15, 1928      6 Sheets-Sheet 1

INVENTOR
Adrian O. Abbott, Jr.
BY
Ernest Hopkinson
ATTORNEY

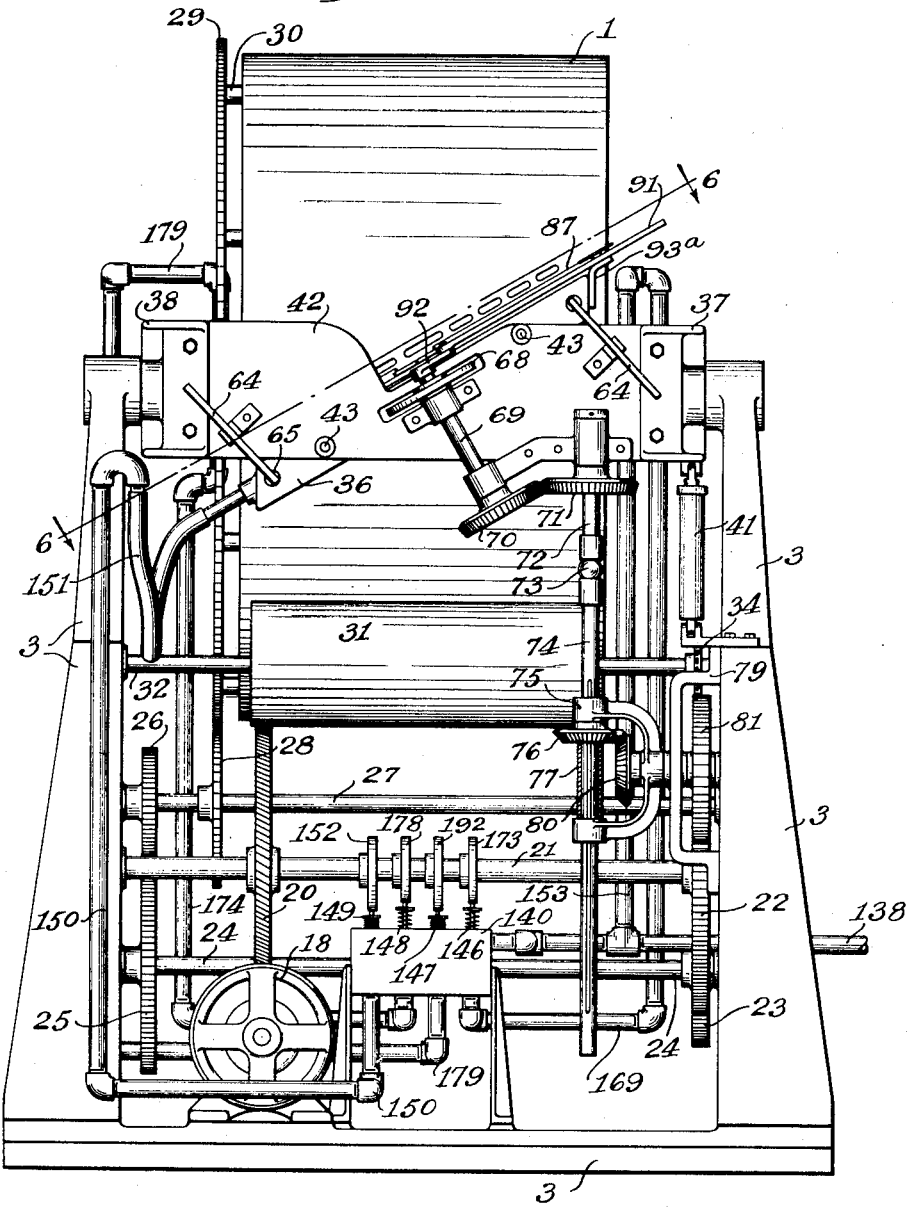

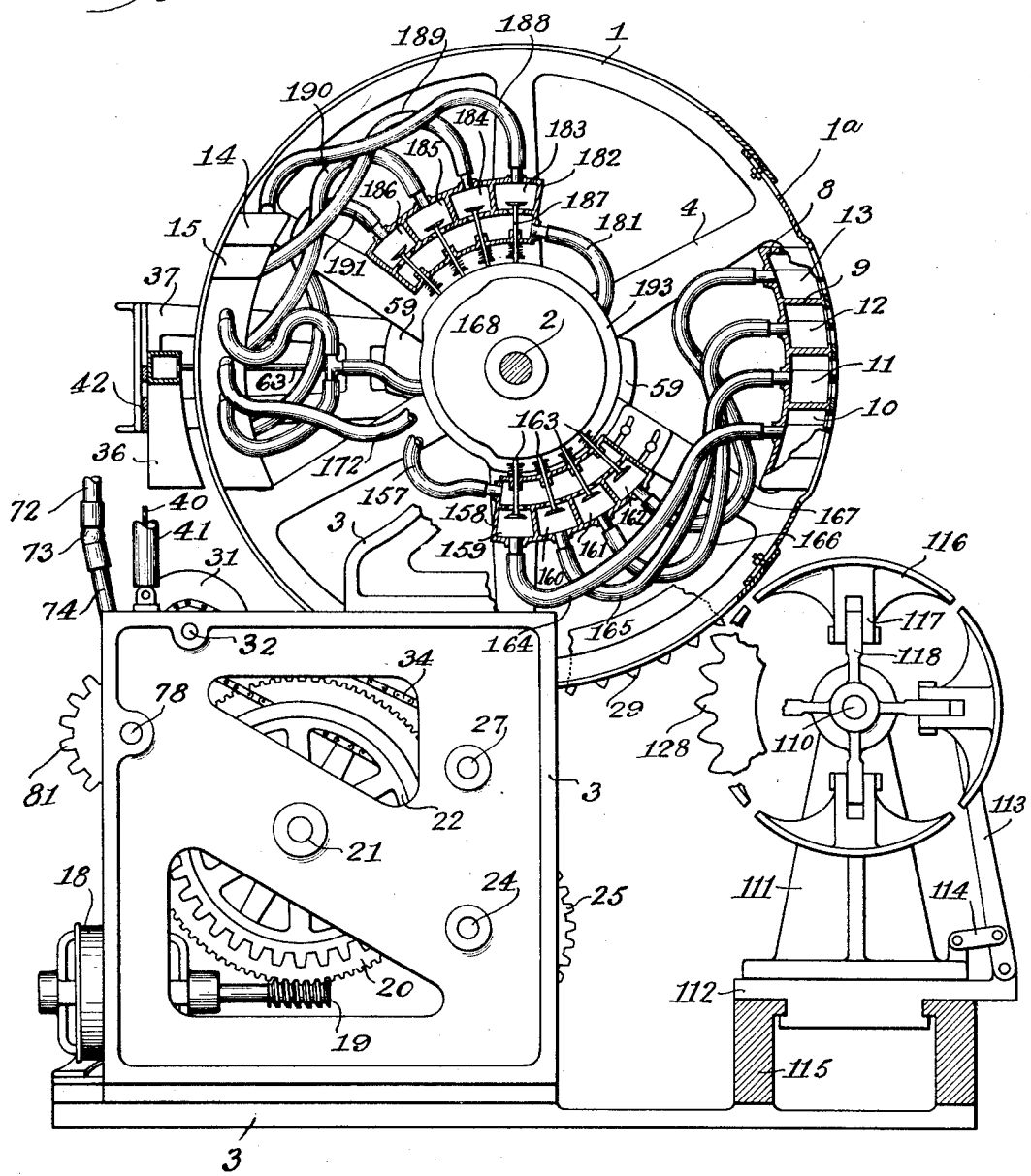

Dec. 12, 1933.   A. O. ABBOTT, JR   1,938,787
PROCESS AND APPARATUS FOR MANUFACTURING TIRES
Filed March 15, 1928   6 Sheets-Sheet 4
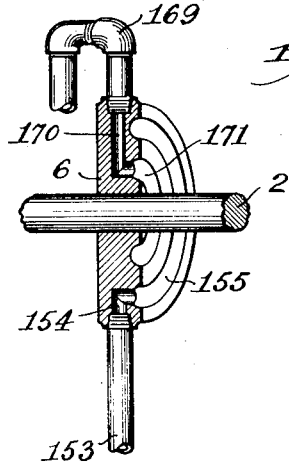
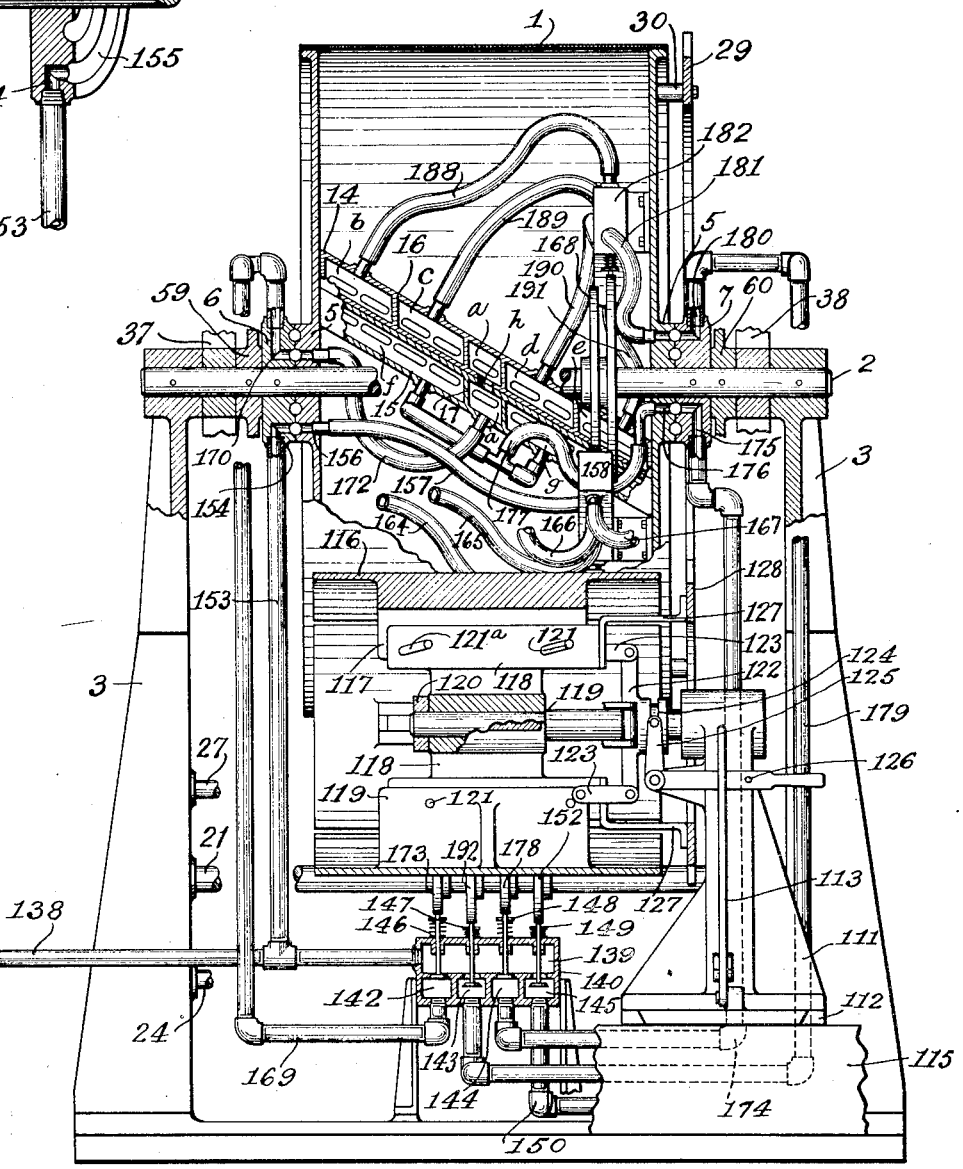
INVENTOR
Adrian O. Abbott, Jr.
BY
Ernest Hoffman
ATTORNEY Dec. 12, 1933.  A. O. ABBOTT, JR  1,938,787
PROCESS AND APPARATUS FOR MANUFACTURING TIRES
Filed March 15, 1928    6 Sheets-Sheet 5
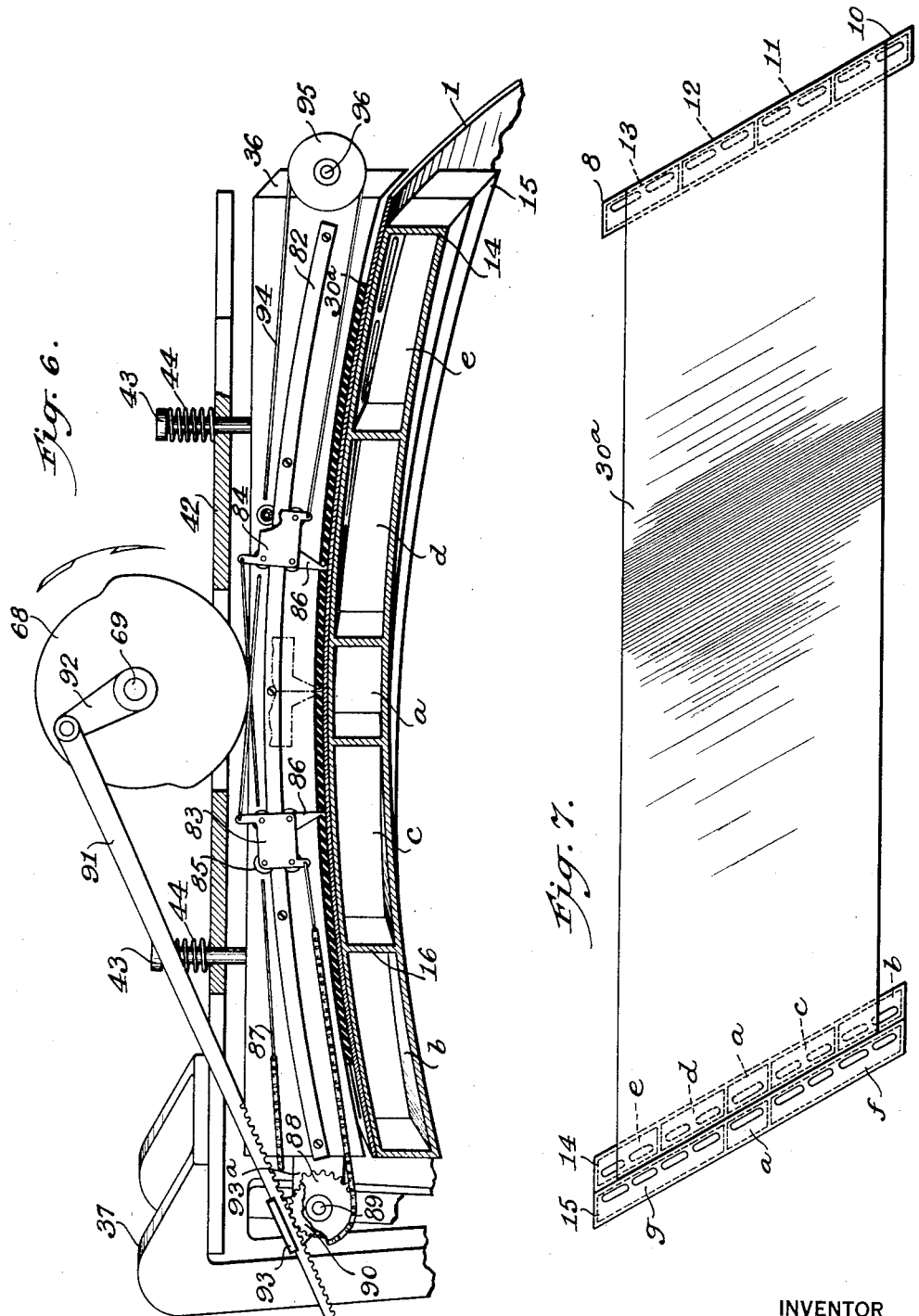
INVENTOR
Adrian O. Abbott, Jr.
BY
Ernest Hopkinson
ATTORNEY Dec. 12, 1933.  A. O. ABBOTT, JR  1,938,787
PROCESS AND APPARATUS FOR MANUFACTURING TIRES
Filed March 15, 1928   6 Sheets-Sheet 6

INVENTOR
Adrian O. Abbott, Jr.
BY
ATTORNEY

Patented Dec. 12, 1933

1,938,787

UNITED STATES PATENT OFFICE 1,938,787

PROCESS AND APPARATUS FOR MANUFACTURING TIRES

Adrian O. Abbott, Jr., Detroit, Mich., assignor to Morgan and Wright, Detroit, Mich., a corporation of Michigan Application March 15, 1928. Serial No. 261,831

19 Claims. (Cl. 154—14)

This invention relates to the manufacture of endless bands. More particularly it relates to an apparatus for mechanically constructing plied annular bands.

It has been customary to manually perform the operations connected with constructing the annular band known as a pulley band which is later to be shaped into a pneumatic tire casing. In constructing and assembling the component parts of a pulley band it is essential that the construction be as uniform throughout the extent of the pulley band as possible. In performing the operations manually there has been localized stretching and distortion of the pulley band and the process has been relatively slow.

It is an object of this invention to provide an apparatus for mechanically forming strips of sheet material of the proper length and for assembling the same into the form of a plied endless band. It is a further object to provide an improved method of severing cord fabric.

Other objects will be apparent from the specification and from the accompanying drawings, in which latter:

Fig. 2 is an end elevation looking toward the feed roll;

Fig. 3 is a view of the machine in elevation with parts broken away to show the interior of the measuring drum and building drum;

Fig. 4 is a view broken away approximately along the line 4—4 of Fig. 1 to show the interior mechanism;

Fig. 5 is a detail perspective view partly in section of a ported hub;

Fig. 6 is a fragmental view along the line 6—6 of Fig. 2 with parts broken away;

Fig. 7 is a diagrammatic development of a measured ply positioned between suction holding devices.

Figure 1:
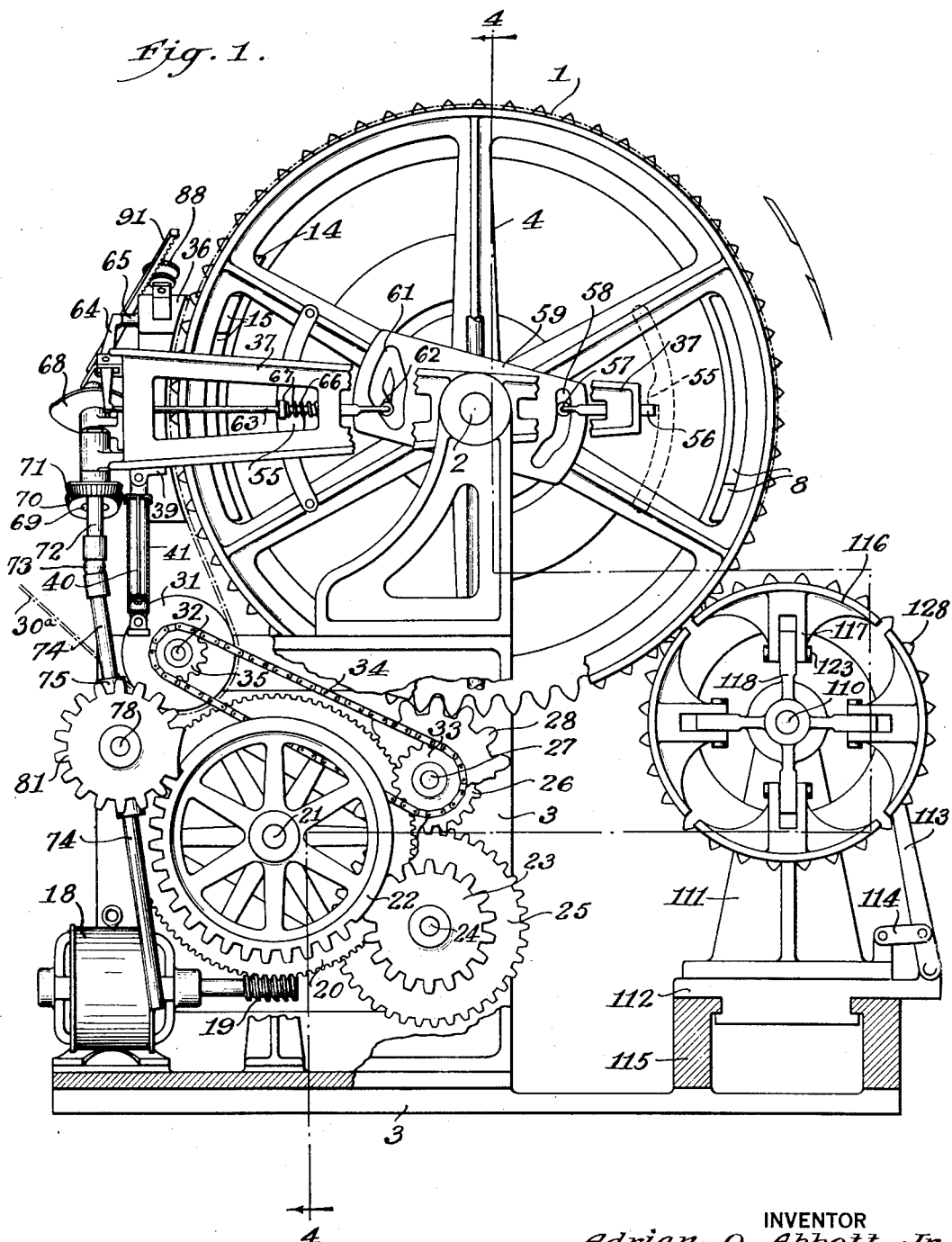
Fig. 1 is a side elevation of the machine with parts broken away.

In its general aspects the device comprises a rotatable drum adapted to serve as a measuring drum and means for applying the end of a continuous supply of sheet material to the surface of the drum. The measuring drum is provided with holding means for securing the end of the sheet material thereto and the measuring drum can be rotated in order to draw a predetermined amount of sheet material upon its surface. Severing means are disposed adjacent the measuring drum which are adapted to sever the sheet material into lengths. The drum can be further rotated whereby the lengths of sheet material are conducted to and disposed upon the surface of a building drum or forming means which retains the sheet material and shapes the same into an annular band. A plurality of measuring drums are provided which are adapted to sever sheet material to varying lengths. The building drum is so disposed that it can be passed into cooperating relationship with each of the measuring drums in turn and thereby construct an annular band formed of a plurality of superimposed plies.

Referring particularly to the drawings, in its preferred embodiment the machine comprises a rotatable work support or measuring drum 1 which is mounted for rotation about a stationary shaft 2. Shaft 2 is rigidly keyed to the main supporting frame 3 of the machine. The measuring drum comprises an outer cylindrical element constituting the support for the work, and radial spokes 4 extending inwardly from the said element and terminating in hubs 5 which are mounted for rotation upon the shaft 2. The hubs 5 are maintained in their proper position longitudinally of the shaft 2 by means of the ported hubs 6 and 7 which are rigidly affixed to the shaft 2.

The work is secured upon the surface of the measuring drum by means of suction applied to the surface thereof through a plurality of spaced perforations in the drum. One of the holding means comprises the suction conduit 8 which is rigidly secured to the under surface of the section 1a of the drum and extends diagonally across the drum at an angle approximating the angle at which cords of the fabric of a cord tire extend across a pulley band. Perforations open from the conduit 8 through the surface of the measuring drum. The conduit 8 is divided by a plurality of transverse walls 9 into the chambers 10, 11, 12 and 13. Suction applied to the surface of the drum through the suction conduit 8 from a source to be later described, serves to hold the end of the sheet material to the drum. The sheet material can be made of rubber composition, fabric, rubberized fabric, etc.

Suction is applied to the surface of the measuring drum in spaced relation to the conduit 8 by means of perforations extending through the surface of the measuring drum from suction conduits 14 and 15 which are rigidly secured to the measuring drum. Conduits 14 and 15 are positioned in abutting relation upon the under surface of the drum extending diagonally across the drum at the same angle that the conduit 8 extends across the drum. Conduit 14 is divided by the transversely extending walls 16 (see Figs. 4 and 6) into the compartments *a, b, c, d* and *e*. The conduit 15 is divided by the transversely extending walls 17 into the compartments *a, f* and *g*.

Rotation of the measuring drum about the stationary shaft 2 is effected by the following arrangements of parts. A motor 18 secured upon the supporting frame 3 is provided with a worm 19 upon its drive shaft. Worm 19 meshes with a worm gear 20 which is rigidly affixed to a shaft 21. Shaft 21 carries rigidly a mutilated gear 22 which is adapted to drive a complementary mutilated gear 23 which is rigidly affixed upon a shaft 24 which, together with the previously mentioned shaft 21, is suitably mounted for rotation in the supporting frame 3. Shaft 24 carries rigidly a gear 25 which is adapted to mesh with a complementary gear 26 which is rigidly carried by the shaft 27. A gear 28 rigidly affixed to the shaft 27 meshes with a gear 29 which is rigidly carried on the arms 30 projecting from the spokes 4 of the measuring drum 1. Actuation of the motor 18 effects rotation of the measuring drum 1 in a clockwise direction, as viewed in Figs. 1 and 3, through the elements as just described.

The sheet material 30*a* is fed to the measuring drum from a source of supply (not shown) around a feed roll 31 which is rigidly supported by a shaft 32. Feed roll 31 is driven at the same peripheral speed as the measuring drum 1 by means of the shaft 27 which carries rigidly a sprocket 33 around which passes a chain 34 which drives a second sprocket 35 which is rigidly mounted upon the shaft 32.

The end of the sheet of material is maintained in position ready to be deposited upon the surface of the measuring drum by means of a suction box 36 which is normally disposed in spaced relation to the surface of the measuring drum by means of brackets 37 and 38 which are pivotally mounted upon the shaft 2 and normally extend horizontally from the shaft 2. Bracket 37 rests adjacent its extremity upon an abutment arm 39 which is carried by the piston rod 40 of the air cylinder 41 which is supported upon an arm extending from the main supporting frame 3. The brackets 37 and 38 carry rigidly a plate 42 which extends across the surface of the measuring drum. The suction box 36 is provided with headed rods 43 (see Fig. 6) which project rigidly outwardly from the surface of the suction box and extend through openings in the plate 42. Springs 44 interposed between the heads of the rods 43 and the plate 42 serve to maintain the suction box 36 supported by the plate 42 in normally spaced relation to the surface of the measuring drum. The length of the rods 43 and of the springs 44 is such that sufficient play is provided for so that the suction box 36 can be moved laterally in order to contact the suction box with the surface of the measuring drum.

During rotation of the measuring drum 1 in a clockwise direction, as viewed in Fig. 1, the portion thereof bearing the suction conduit 8 arrives at a position adjoining the suction box 36. At this time the suction box is passed in rotary movement at the same speed and the same direction as the measuring drum and also it is moved laterally toward the measuring drum until it presses the sheet material against the surface of the measuring drum. Circumferential movement of the suction box 36 and corresponding pivotal movement of supporting brackets 37 and 38 is effected by means of stops 55 (see Fig. 1) which are carried rigidly by the spokes 4 of the measuring drum. When the suction conduit 8 directly adjoins the suction box 36, the stops 55 engage trip rods 56 which are mounted in the brackets 37 and 38 for longitudinal reciprocating movement. The trip rods 56 carry at one extremity cam rolls 57 which are adapted to travel in the cam grooves 58 of the cams 59 and 60. Cams 59 and 60 are rigidly secured upon the stationary shaft 2. The cam groove 58 is so shaped that as the brackets 37 and 38 have reached the position shown in Fig. 10, the trip rod 56 will be drawn out of engagement with the stop 55. Brackets 37 and 38 with their supported mechanism will thereupon drop by force of gravity back to their original position the air cylinder 41 causing them to drop back slowly.

While the brackets 37 and 38 are being carried in their limited pivotal movement, the suction box 36 is moved laterally until it presses the work carried thereby against the surface of the measuring drum 1. Cam grooves 61 in the cams 59 and 60 (see Fig. 1) effect lateral movement of the box 36. The cam grooves are engaged by cam rolls 62 which are carried by push rods 63, the rods being mounted for longitudinal reciprocating movement in the brackets 37 and 38. The push rods engage rocker arms 64 which are pivoted in supports carried by the plate 42. One end of each of the rocker arms engages a push rod 65 (see Figs. 1 and 2) which projects outwardly rigidly from the suction box 36. A spiral spring 66 is carried by each of the push rods 63 bearing at one end against a portion of the brackets 37 and 38 and at its opposite end against stops 67 carried by the push rods 63. The springs 66 tend to normally maintain the push rods 63 pressed outwardly against the rocker arms 64. As the brackets 37 and 38 pass in their pivotal movement, the cam roll 62 is moved outwardly by the cam groove, forcing the suction box 36 with the work carried thereby laterally against the face of the measuring drum. At this time, suction is withdrawn from the suction box 36 and is supplied to the suction conduit 8, thereby releasing the work from the box 36 and securing it to the surface of the measuring drum at 8. The brackets 37 and 38 are then returned to their normal position, the cam rolls 62 following the inside groove of the cam, thereby permitting the suction box 36 to be forced and maintained in spaced relation to the surface of the measuring drum.

The measuring drum continues in rotary movement with the end of the sheet material secured thereto, thereby drawing additional sheet material on to its surface until the portion of the drum bearing the suction conduit 15 has reached a position directly adjoining the suction box 36. Further rotation of the measuring drum is stopped at this point due to the engagement of the mutilated portions of the gears 22 and 23 with each other. The suction box 36 is again forced laterally into position bearing against the sheet material upon the measuring drum. Its lateral movement is effected in this case by means of a cam 68 (see Figs. 1, 2 and 6) which is rigidly mounted upon a shaft 69. Shaft 69 is rotatably mounted in suitable bearings carried by the plate 42. During rotation of the cam 68, the high spot thereof engages the outer surface of the box 36 and forces the latter laterally against the measuring drum. Shaft 69 is driven by a bevel gear 70 which is rigidly carried upon the shaft 69 and which meshes with a complementary bevel gear 71 which is rigidly carried upon the shaft 72. Shaft 72 is rotatably supported in a bearing carried upon the plate 42. A universal coupling 73 connects shaft 72 with a shaft 74, which latter is rotatably supported by the arms of a yoke 75. A bevel gear 76 (see Fig. 2) is keyed to the shaft 74 for sliding movement thereon in a longitudinal direction. Gear 76 is held in position against one of the arms of the yoke 75 by means of the quill tube 77 which bears at its opposite end against the second arm of the yoke. The yoke 75 is pivotally mounted upon a shaft 78 which is rotatably mounted in the frame 3 and in a bracket 79 extending rigidly from the frame 3. Shaft 78 carries rigidly a bevel gear 80 which is adapted to mesh with and drive the gear 76. The shaft 78 in turn is driven by a mutilated gear 81 carried rigidly thereby, which gear is adapted to cooperate with the complementary mutilated gear 22. By means of the universal coupling 73, the provision for longitudinal sliding movement of the shaft 74 and the pivotal movement of the yoke 75, provision is made for travel of the cam 68 with brackets 37 and 38 without throwing the driving mechanism for the cam out of engagement therewith.

While the suction box 36 is forced against the portion of the measuring drum which carries the suction conduit 15, the sheet material is secured to the drum by suction applied through the openings in the measuring drum leading from the chambers b, c, d, e, f and g of the suction conduits 14 and 15. The sheet material is next severed along a line between the two suction conduits 14 and 15 by the following mechanism. A runway 82 (see Fig. 6) is rigidly affixed to the suction box 36 in spaced relation to the outer wall thereof. Knife supporting mechanisms 83 and 84 are supported upon the runway 82 by means of rolls 85 carried thereby. Pointed knife blades 86 project laterally from the holding mechanisms 83 and 84 and are in abutting relationship at the beginning of a cut, as shown in dotted lines in Fig. 6, forming cooperating severing means for completely severing the sheet material when drawn in opposite directions toward the edges of the sheet material. When the knife blades have initially pierced the sheet material, suction is applied to chambers a and is released from chambers b, c, d, e, f and g. The initial position of the knife holding mechanisms 83 and 84 in making a cut is opposite the chambers a at the middle of the measuring drum, as shown in dotted lines in Fig. 6. The blade holding mechanisms 83 and 84 are connected to each other by a flexible chain and cord 87, the chain portion of which passes around and meshes with a sprocket wheel 88 which is rigidly mounted upon a spindle 89. Spindle 89 is rotatably mounted in a bracket 93a projecting from the box 36. Spindle 89 carries rigidly a gear 90 which is adapted to mesh with the teeth of a rod 91 which is pivotally connected to a crank arm 92. Crank arm 92 is rigidly affixed to the shaft 69. An arm 93 carried by the bracket 93a overhangs the rod 91 and insures positive engagement of the teeth of the rod 91 with the gear 90. A cord 94 connects the knife holding mechanisms 83 and 84 and passes around a roll 95, which is mounted for rotary movement upon a spindle 96 which is supported at the opposite end of the box 36 from the gears just described. During rotation of the cam 68 with the high spot thereof pressing the suction box 36 against the measuring drum, the rod 91 is caused to move longitudinally, thereby causing the chain and cord 87 and cord 94 to pull the knives in opposite directions through the sheet material severing the same. Suction is applied to chambers b, c, d, e, f and g upon completion of the cut. Continued rotation of the cam 68 after the knives have completed the severing operation, causes the rod 91 to reciprocate in the opposite direction forcing the knife carrying mechanism back to its original position adjacent the middle of the box 36. Suction is then withdrawn from chambers f and g and is actuated in box 36. The low spot of the cam then comes into engagement with the box 36, thereby permitting the box to be moved laterally by the springs 44 away from the measuring drum, carrying the end of the strip material supply with it.

Having severed the sheet material to the desired length, the length is applied to and secured upon the surface of a building drum. The building drum is supported upon a stationary shaft 110 which in turn is secured by the support 111. The base of the support 111 is mounted for sliding movement toward and from the measuring drum in ways in a table 112. A lever 113 is pivotally carried by the table 112. A connecting link 114 is pivotally attached at one end to the lever 113 and at its opposite end is pivotally attached to the support 111. Actuation of the lever moves the building drum toward or away from the surface of the measuring drum 1. Longitudinal adjustment of the building drum with respect to the measuring drum can be effected by moving the table 112 longitudinally through the ways provided by the runway 115 which is rigidly mounted upon the main frame 3 of the machine.

The building drum or forming means is comprised of a plurality of arcuate segments 116 which are provided upon their inner portions with projecting forked arms 117. A spider 118 is mounted for rotation upon the shaft 110 abutting at one end against a shoulder 119 (see Fig. 4) carried by the shaft and being held against the shoulder by a suitable nut 120. The arms of the spider project into the forked arms 117 of the segments 116. Pins 121 rigidly carried by the forked arms 117 project through slots 121a which extend diagonally through the arms of the spider 118. An adjusting collar 122 for securing radial adjustment of the segments 116 is loosely mounted upon the shaft 110 for sliding movement thereon and is connected by the links 123 with the forked arms 117. A groove 124 in the collar 122 is adapted to be engaged by a roll carried by the bell crank 125 which is pivoted to the support 111. A pin 126 carried by the opposite arm of the bell crank is adapted to engage in grooves in the support 111, thereby maintaining the adjustment of the bell crank 125. Adjustment of the bell crank 125 moves the segments 116 longitudinally of the spider 118 and thereby effects radial movement of the segments due to the movement of the pins 121 in the slots 121a. The arms of the spider 118 carry rigidly brackets 127 which project outwardly laterally from the building drum and carry rigidly a gear 128. Gear 128 is adapted to mesh with and be driven by the gear 29 of the measuring drum 1, thereby effecting rotation of the building drum at the same peripheral speed as the measuring drum. The building drum is provided with a holding surface formed of a thin solution of rubber cement.

Suction holding means can be substituted for the cement.

Suction is applied to the surface of the suction box 36 in order to hold the sheet material which is to be fed upon the measuring drum 1. The suction is applied from a suitable source of suction (not shown) to a conduit 138 (see Figs. 2 and 4) which has fluid communication with the distributing chamber 139 of the valve box 140. Box 140 is supported on brackets carried by the main supporting frame 3. Valve box 140 is provided with the auxiliary chambers 142, 143, 144 and 145 which have fluid communication with the distributing chamber 139. Spring actuated valves 146, 147, 148 and 149 normally maintain communication closed between the distributing chamber and the auxiliary chambers. A conduit 150 is connected with the auxiliary chamber 145 and with a flexible conduit 151 which opens into the suction box 36. The valve 149 is actuated by means of a cam 152 which is rigidly mounted with the shaft 21. The cam 152 is so proportioned that during its rotation it will open the valve 149 and permit suction to be applied from the distributing chamber to the box 36 upon return of the knives to their original position the completion of the operation in which the sheet material is severed. Suction is maintained in the suction box 36 securing the end of the sheet material thereto until the portion of the measuring drum which carries the suction conduit 8 has passed in its travel to a position adjoining the box 36. The box 36 is then moved laterally against the measuring drum and suction is withdrawn therefrom by engagement of the low spot of the cam 152 against valve 149.

At this time suction is applied to the suction conduit 8 from a conduit 153 (see Figs. 2 and 4) which has fluid communication with the conduit 138 and opens into the port 154 of the stationary ported hub 6. The port 154 opens into the annular groove 155 in the bearing surface of the stationary hub 6. Groove 155 cooperates with a complementary groove in the hub 5 which latter groove opens into the port 156 in the hub 5. A conduit 157 has fluid communication with the port 156 and with the distributing chamber of a valve box 158. Valve box 158 is mounted adjustably circumferentially upon the spokes 4 of the measuring drum 1 by means of a pin and slot connection, as shown in Fig. 3. A plurality of auxiliary chambers 159, 160, 161 and 162 are provided in the valve box 158 and have fluid connection with the distributing chamber. A plurality of spring pressed valves 163 normally shut off communication between the distributing chamber and the auxiliary chambers. Flexible conduits 164, 165, 166 and 167 connect the chambers 159, 160, 161 and 162 with the chambers 10, 11, 12 and 13 respectively of suction conduit 8. The valves are actuated by means of a cam 168 which is rigidly mounted upon the stationary shaft 2. The cam 168 is so proportioned that the valves are opened when the measuring drum has rotated to a position in which the suction conduit 8 adjoins the suction box 36. Suction continues to be applied to the box 8 during rotation of the measuring drum 1 until the chambers 10, 11, 12 and 13 pass the building drum at which time the valves which control the suction in these chambers pass respectively from the high spot of the cam 168 to the low spot thereof, thereby progressively withdrawing suction from the chambers. The portion 1ª of the measuring drum which carries the suction conduit 8 is made adjustable circumferentially with respect to the remainder of the drum by means of a slot and bolt connection shown in Fig. 3. It is preferred that a strip of material of a length somewhat greater than the extent of the periphery of the building drum 116 be severed from the material supplied to the measuring drum so as to permit of a lap or splice. The lengths of these strips of material will vary somewhat in actual practice and for this reason, among others, the distance between suction conduits 15 and 8 is made adjustable. Upon adjusting the position of suction conduit 8 upon the measuring drum, it will be necessary to adjust the position of the valve box 158 in order that suction can be withdrawn from conduit 8 and the sheet material released from the measuring drum and applied to the building drum at the proper time.

Continued rotation of the measuring drum brings the portion of the drum bearing the suction conduit 15 to a position directly opposite the suction box 36. Suction is now applied to chambers $b$, $c$, $d$, $e$, $f$ and $g$ of conduits 14 and 15 to stretch the sheet material slightly so that the knives will readily pierce the fabric. Suction box 36 is thereupon moved laterally against the measuring drum and the cutting operation is commenced. After the knives 86 have pierced the sheet material, suction is withdrawn from the chambers $b$, $c$, $d$, $e$, $f$ and $g$ and is applied to the chambers $a$ of the conduits 14 and 15. It is applied to chambers $a$ from a conduit 169 (see Figs. 2 and 4) which has fluid communication with the chamber 142 of the valve box 140. Conduit 169 opens into the port 170 which extends through the hubs 6 and 5. Communication between the sections of the port 170 in the two hubs 5 and 6 is effected continuously during rotation of the hub 5 by means of the cooperating annular grooves 171 (see Fig. 5) in the two hubs. A conduit 172 connects the port 170 with the chamber $a$ of the suction conduit 15. A passage $h$ connects chamber $a$ of conduit 15 with chamber $a$ of conduit 14. A cam 173 is rigidly mounted upon the shaft 21 and engages the valve 146 which regulates passage of suction to the chambers $a$. The cam is so formed that it permits the valve 146 to seat when the sheet material has been severed, withdrawing suction from chambers $a$. By not holding the sheet material opposite the chambers $a$ when the knives 86 pierce the material, the material is forced laterally should the knives strike the top of a cord and the cord is not split.

When the sheet material being operated upon is cord fabric, the fabric is disposed upon the measuring drum with the cords extending approximately parallel to the extent of the suction conduits. The cutting knives pass through the fabric between the cords thereof and cause a creeping of the cords into alignment with the path of travel of the knives. When the knives have been drawn beyond the edges of the fabric, suction is applied to the chambers $b$, $c$, $d$, and $e$ of conduit 14 and chambers $f$ and $g$ of conduit 15. Chambers $f$ and $g$ communicate with the chamber 144 of the valve box 140 by means of a conduit 174 which leads from the chamber 144 to the port 175 of the stationary hub 7. Port 175 communicates with a port 176 in the rotatable hub 5 by means of cooperating annular grooves in the surface of the two hubs. A conduit 177 leads from the port 176 to the chambers $f$ and $g$. The valve 148 which controls application of suction to conduit 174 is actuated by a cam 178 which is rigidly mounted upon the shaft 121. Cam 178 is so proportioned and driven that it opens the valve 148 at the time that the conduit 15 arrives in position opposite box 36. When the box 36 has been moved against conduit 15 and the knives 86 have pierced the sheet material, the valve 148 is seated. When the knives have reached a position slightly beyond the edges of the sheet material, the cam 178 again permits valve 148 to open applying suction to chambers *f* and *g* until the knives have been drawn back to their initial position at which time the valve 148 is again permitted to seat.

Fluid communication between the chambers *b*, *c*, *d* and *e* of the suction conduit 14 and the chamber 143 of the valve box 140 is effected through the following elements: Conduit 179 at one end opens into the chamber 143 and at its other end is connected to the port 180 which extends through the hubs 5 and 7. A conduit 181 connects port 180 with the distributing chamber of a valve box 182 which is rigidly mounted upon the spokes 4 of the measuring drum. A plurality of auxiliary chambers 183, 184, 185 and 186 have fluid communication with the distributing chamber. Communication between the auxiliary and distributing chambers is normally maintained closed by means of the spring pressed valves 187. Conduits 188, 189, 190 and 191 provide fluid communication between the chambers 183, 184, 185 and 186 and the chambers *b*, *c*, *d* and *e* respectively of conduit 14. A cam 192 rigidly mounted upon the shaft 21 actuates the valve 147 regulating the application of suction to valve box 182 and from there to conduit 14. The cam is so formed that it opens the valve 147 when the conduit 15 has arrived opposite box 36. When the knives have initially pierced the sheet material, the cam 192 permits the valve to seat. When the knives 86 have reached the outer ends of their paths, the cam 192 permits the valve 147 to open and permits it to remain open until the suction conduit 14 is carried during rotation of the drum 1 past the building drum 116. In order that suction can be progressively released from the chambers *b*, *c*, *d* and *e*, as they pass the building drum 116, and the length of sheet material withdrawn from the building drum, the valves 187 are caused to bear against and be actuated by a cam 193 which is rigidly mounted upon the stationary shaft 2. As the valves alternately pass from the high spot to the low spot of the cam, suction is released from the chambers *b*, *c*, *d* and *e* respectively, thereby permitting the sheet material to be secured to the building drum 116.

*Operation*

Figure 8:
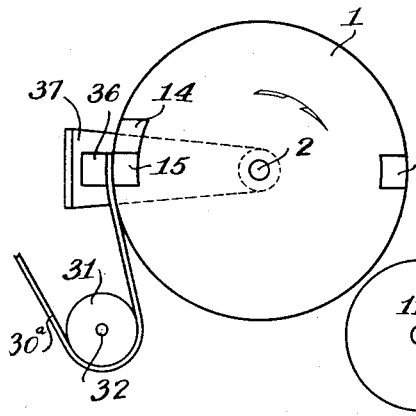
Figs. 8 to 13 are diagrammatic views of the machine showing the position of basic parts thereof in the various steps of the operation.
Figure 11:
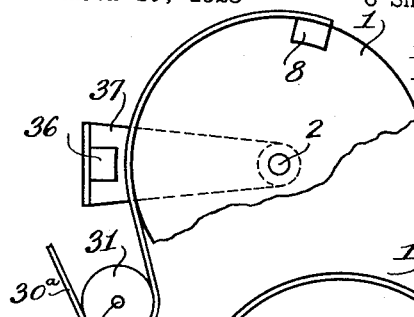
Figure 9:
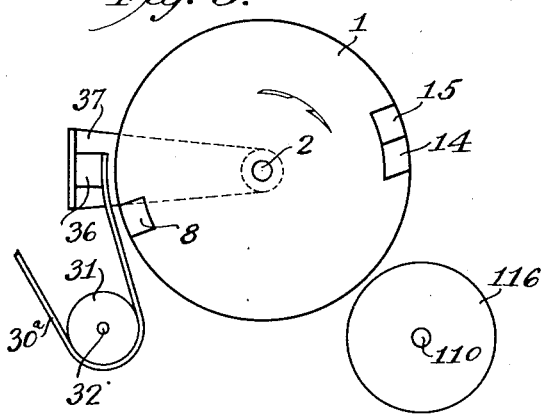
Figure 10:
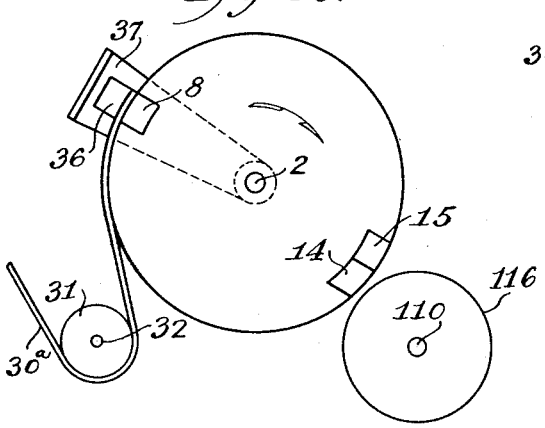

In the operation of the machine, sheet material is fed from a source of supply (not shown) around a feed roll 31 to the suction box 36 where it is secured by force of the suction within the box, as shown in Fig. 9, or the box 36 may receive the end of the material from conduit 15 at the conclusion of a preceding cutting operation, as shown in Fig. 8. The sheet material can be severed manually, if desired, along the edge of the box 36. Rotation of the measuring drum 1 is effected whereby the portion thereof bearing the suction conduit 8 is conducted to a position in radial alignment with the suction box 36. Box 36 is now carried circumferentially due to engagement of the stop 55 with the trip 56 of the brackets 37 and 38. At the same time, the suction box 36 is forced laterally pressing the end of the sheet material against the surface of the measuring drum 1, as shown in Fig. 10. When the sheet material has been contacted with the surface of the measuring drum, suction is withdrawn from the suction box 36 and is applied to the suction conduit 8 whereby the sheet material is secured to the measuring drum. Having effected transfer of the sheet material, the suction box 36 is moved laterally away from the measuring drum and is permitted to fall by force of gravity to its original position as shown in Fig. 11.

Figure 12:
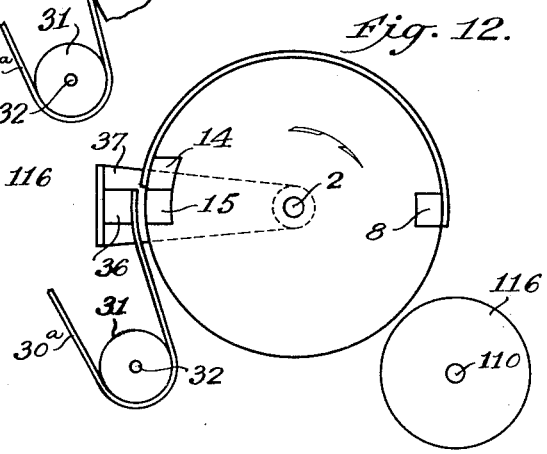
Figure 13:
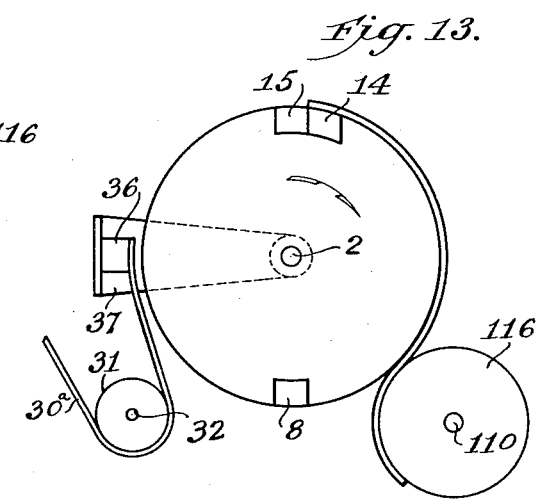

Continued rotation of the measuring drum draws additional sheet material upon the surface of the drum until the suction conduit 15 has arrived at a position in radial alignment with the suction box 36. The mutilated portions of the gears 22 and 23 slide upon each other at this time, permitting the measuring drum 1 to remain stationary. Suction is now applied to chambers *c*, *d*, *e*, *f* and *g* stretching the sheet material between their respective openings upon the surface of drum 1. The cam 68 is now actuated to force the suction box 36 laterally against the measuring drum, thereby pressing the knives 86 into the sheet material piercing the same opposite the chambers *a* of the conduits 14 and 15. Suction is now withdrawn from chambers *b*, *c*, *d*, *e*, *f* and *g* and applied to chambers *a*. The knives now are drawn from their original position at the middle portion of the measuring drum diagonally across the drum, cutting the cord fabric between the cords. When the knives have reached a position beyond the edges of the material, suction is applied through the chambers *b*, *c*, *d*, *e*, *f* and *g* and withdrawn from chambers *a*. The knives are brought back to their initial position after which suction is withdrawn from chambers *f* and *g*. The cam 68 permits the box 36 to be moved laterally away from the measuring drum 1 by the springs 44 and suction applied to the suction box 36 causes the end of the supply of sheet material to be carried therewith as shown in Fig. 12. The severed length of sheet material is carried by rotation of the measuring drum to a position in which the forward end thereof secured by the suction box 8 passes the building drum 116. Suction is progressively withdrawn from the chambers 10, 11, 12 and 13 of suction box 8, so that the end of the length of sheet material is freed from the measuring drum and can be secured to the holding surface of the building drum. The building drum is rotated at the same peripheral speed as the measuring drum with the adjoining surfaces moving in the same direction so that the length of sheet material is wound around the building drum 116 as shown in Fig. 13. As the chambers *b*, *c*, *d* and *e* of the suction conduit 14 are conducted past the building drum, suction is progressively withdrawn therefrom, permitting the sheet material to be secured to the building drum. The ends of the length of sheet material deposited upon the building drum 116 are pressed into overlapping relation between the building and measuring drums. If desired, the size of the building drum and length of sheet material can be so adjusted that the ends will not overlap.

In the application of this device to the building of a pulley band, it is contemplated to sever the component strips of rubberized fabric and rubber composition to varying lengths upon a plurality of measuring drums. A building drum can then be passed along the runway 115 into alternate engagement with the various measuring drums and the lengths of fabric and rubber composition applied thereto alternately until a pulley band has been assembled upon the building drum. The circumference of the building drum can then be reduced by actuation of the hand lever 113 so that the pulley band can be removed therefrom.

While the specific embodiment of the invention has been shown and described, it is obvious that numerous modifications in the details will suggest themselves to those skilled in the art, and it is not desired that the invention be limited otherwise than as set forth in the appended claims.

Having thus described my invention what I claim and desire to protect by Letters Patent is:

1. A measuring and severing device comprising a support for sheet material, means for causing travel of the support, means for feeding sheet material to the support, means for securing the sheet material to the support, and means for severing the sheet material to length.

2. A measuring and severing device comprising a support for sheet material, means for causing travel of the support, means for applying a portion of sheet material to the traveling support, means for securing the sheet material to the support whereby additional sheet material is drawn upon the support during travel of the latter, means for severing the sheet material to length, and means for deactivating the securing means.

3. A measuring and severing device comprising a support, feeding means adapted to carry sheet material, means for causing the feeding means to press a portion of the sheet material against the support, means for releasing the sheet material from the feeding means, means for securing the sheet material to the support, means for causing limited travel of the support whereby additional sheet material is drawn upon the support, and means for severing the sheet material to length.

4. A measuring and severing device comprising a cylindrical support, means for securing a portion of sheet material to the support, means for causing rotation of the support whereby a predetermined amount of the sheet material is drawn thereon, and means for severing the portion of the sheet material upon the support to length.

5. A device for forming endless bands comprising a support, means for applying sheet material thereto, means for causing intermittent travel of the support whereby additional sheet material is drawn upon the support, means for severing the sheet material to length during a period of rest of the support, and means for removing the length from the support during renewed travel of the support and for shaping the length into an endless band.

6. A device for forming endless bands comprising a support, adapted to carry sheet material, means for securing the sheet material to the support, means for severing the sheet material to length, means for progressively deactivating the securing means, and means for progressively removing the length from the support and for overlapping the ends of the length.

7. A device for forming endless bands comprising a support, means for applying sheet material thereto, means for severing the sheet material to length, forming means adapted to be disposed in contact with the support, means for causing travel in the same direction of the adjoining portions of the forming means and support whereby the length is progressively applied to the forming means, and means for securing the length to the forming means.

8. In a measuring and severing device, a support adapted to carry cord fabric, means whereby a localized portion of the fabric is secured to the support, severing means, and means for conducting the severing means through the fabric generally longitudinally of the cords from the secured portion through the unsecured portion.

9. In a measuring and severing device, a support for cord fabric, severing means, means for causing the severing means to pierce the fabric, means for securing the pierced portion of fabric to the support, and means for conducting the severing means from the secured portion of fabric through the unsecured fabric.

10. In a measuring and severing device, a support adapted to carry sheet material, means whereby the sheet material is secured to the support, a plurality of severing means, means for disposing the severing means in contact with the material in spaced relation to the edges thereof, and means for conducting the severing means toward the edges of the material to sever the material.

11. In a measuring and severing device, a support adapted to carry sheet material, means whereby the sheet material is secured to the support, a plurality of severing means, means for disposing the severing means in contact with the material in spaced relation to the edges thereof, means for drawing one of the severing means toward an edge of the material severing the same, and means connected to the said severing means for drawing the cooperating severing means toward the other edge of the material severing the same.

12. The method of severing sheet material which comprises securing a portion of the sheet material to a support and passing severing means from the secured portion of the sheet material through the unsecured portion severing the same.

13. The method of severing cord fabric which comprises securing a portion of the cord fabric spaced from the edges thereof to a support, and passing severing means from the secured portion through the fabric in the general direction of the extent of the cords.

14. The method of severing cord fabric which comprises stretching a portion of the cord fabric, piercing the stretched portion, and passing severing means from the pierced portion through the fabric in the general direction of the extent of the cords.

15. The method of severing cord fabric which comprises securing spaced portions of the cord fabric to a support, piercing the fabric between the secured portions, securing the pierced portion to the support, releasing the unpierced portions, and passing severing means from the pierced portion through the unpierced portions in the general direction of the extent of the cords of the fabric.

16. The combination with a drum for shaping a tire band, of means for measuring the length of and severing a strip of material and delivering it directly to the shaping drum.

17. The combination with a drum for shaping a tire band, of a machine for measuring and severing strip material comprising a supporting drum, and means for delivering material directly from the supporting drum to the shaping drum.

18. The combination with a movable drum for shaping a tire band, of means for measuring the length of and severing a strip of material for direct delivery to the shaping drum, and means for moving the shaping drum into position to receive the material.

19. The combination with a movable drum for shaping a tire band, of a machine for measuring and severing strip material comprising a supporting drum and means for delivering material from the supporting drum to the shaping drum, means for moving the shaping drum into position to receive said material from the supporting drum, and means for actuating the shaping drum in synchronism with the movement of the supporting drum during the transfer of the strip material.

ADRIAN O. ABBOTT, Jr.